United States Patent
Jones et al.

(10) Patent No.: US 7,951,498 B2
(45) Date of Patent: May 31, 2011

(54) METHOD AND APPARATUS FOR CONTROLLING AN INTEGRATED FUEL CELL SYSTEM

(75) Inventors: Daniel O. Jones, Glenville, NY (US); John W. Parks, Loudonville, NY (US)

(73) Assignee: Plug Power Inc., Latham, NY (US)

( * ) Notice: Subject to any disclaimer, the term of this patent is extended or adjusted under 35 U.S.C. 154(b) by 1175 days.

(21) Appl. No.: 11/503,853

(22) Filed: Aug. 14, 2006

(65) Prior Publication Data
US 2008/0220300 A1 Sep. 11, 2008

Related U.S. Application Data (63) Continuation of application No. 10/158,754, filed on May 30, 2002, now abandoned, which is a continuation-in-part of application No. 09/749,297, filed on Dec. 27, 2000, now Pat. No. 6,581,015.

(60) Provisional application No. 60/294,710, filed on May 31, 2001.

(51) Int. Cl.
*H01M 8/04* (2006.01)
*H01M 8/10* (2006.01)
*G01R 21/06* (2006.01)

(52) U.S. Cl. ........... 429/431; 429/432; 429/479; 702/60

(58) Field of Classification Search ............ 429/23, 429/30, 19, 24, 22, 431, 432, 479, 429; 702/60, 702/63
See application file for complete search history.

(56) References Cited

U.S. PATENT DOCUMENTS
4,642,273 A * 2/1987 Sasaki .......................... 429/423
4,988,283 A * 1/1991 Nagasawa et al. .............. 429/17

FOREIGN PATENT DOCUMENTS
JP 6463273 A * 3/1989
WO WO 9905741 A1 * 2/1999

OTHER PUBLICATIONS
Abstract of JP 6463273 A, Takemoto, Toshiaki, Mar. 1989.*
English translation of JP 6463273 A, Takemoto, Toshiaki, Mar. 1989.*

* cited by examiner

*Primary Examiner* — Jonathan Crepeau
*Assistant Examiner* — Kenneth Douyette
(74) *Attorney, Agent, or Firm* — Trop, Pruner & Hu, P.C.

(57) ABSTRACT

A control algorithm for operating an integrated fuel cell system includes the following steps: determining whether a power output of a fuel cell is within a first predetermined range of an electrical load coupled to the fuel cell; lowering a reactant flow to the fuel cell when the power output is within the first predetermined range; detecting an increase of the electrical load; determining whether the increase exceeds a second predetermined range; and increasing a reactant flow to the fuel cell when the increase exceeds the second predetermined range.

9 Claims, 4 Drawing Sheets

METHOD AND APPARATUS FOR CONTROLLING AN INTEGRATED FUEL CELL SYSTEM

CROSS REFERENCE TO RELATED APPLICATIONS

This application is a continuation of U.S. patent application Ser. No. 10/158,754 entitled "METHOD AND APPARATUS FOR CONTROLLING AN INTEGRATED FUEL CELL SYSTEM," filed on May 30, 2002 now abandoned, which is a continuation-in-part of U.S. patent application Ser. No. 09/749,297, filed on Dec. 27, 2000, which is now U.S. Pat. No. 6,581,015; and this application also claims priority under 35 USC 119(e) from U.S. Provisional Application No. 60/294,710, filed May 31, 2001, naming Jones and Parks inventors, and titled "METHOD AND APPARATUS FOR CONTROLLING AN INTEGRATED FUEL CELL SYSTEM," an application that is incorporated herein by reference in its entirety and for all purposes.

BACKGROUND

The invention generally relates to an integrated fuel cell system and associated methods for controlling the system.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

$H_2 \rightarrow 2H^+ + 2e^-$ at the anode of the cell, and $O_2 + 4H^+ + 4e^- \rightarrow 2H_2O$ at the cathode of the cell.

A typical fuel cell has a terminal voltage of up to about one volt DC. For purposes of producing much larger voltages, multiple fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow field plates (graphite composite or metal plates, as examples) that are stacked one on top of the other. The plates may include various surface flow field channels and orifices to, as examples, route the reactants and products through the fuel cell stack. A PEM is sandwiched between each anode and cathode flow field plate. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow field channels and diffuse through the GDLs to reach the PEM. The PEM and its adjacent pair of catalyst layers are often referred to as a membrane electrode assembly (MEA). An MEA sandwiched by adjacent GDL layers is often referred to as a membrane electrode unit (MEU).

A fuel cell system may include a fuel processor that converts a hydrocarbon (natural gas or propane, as examples) into a fuel flow for the fuel cell stack. For a given output power of the fuel cell stack, the fuel flow to the stack must satisfy the appropriate stoichiometric ratios governed by the equations listed above. Thus, a controller of the fuel cell system may monitor the output power of the stack and based on the monitored output power, estimate the fuel flow to satisfy the appropriate stoichiometric ratios. In this manner, the controller regulates the fuel processor to produce this flow, and in response to the controller detecting a change in the output power, the controller estimates a new rate of fuel flow and controls the fuel processor accordingly.

The fuel cell system may provide power to a load, such as a load that is formed from residential appliances and electrical devices that may be selectively turned on and off to vary the power that is demanded by the load. Thus, the load may not be constant, but rather the power that is consumed by the load may vary over time and abruptly change in steps. For example, if the fuel cell system provides power to a house, different appliances/electrical devices of the house may be turned on and off at different times to cause the load to vary in a stepwise fashion over time. Fuel cell systems adapted to accommodate variable loads are sometimes referred to as "load following" systems.

There is a continuing need for integrated fuel cell system and associated methods for controlling such system designed to achieve objectives including the forgoing in a robust, cost-effective manner.

SUMMARY

The invention provides control systems and algorithms for load following fuel cell systems. In one aspect, a control network is provided for an integrated fuel cell system. A fuel cell has an output power that is characterized by a voltage and a current. A controller is adapted to vary a reactant flow to the fuel cell (e.g., by modulating a variable output blower or a valve on a pressure vessel). An electrical load (e.g., a power requirement of a collection of electrical appliances drawing power from the fuel cell) is connected to the fuel cell such that the fuel cell output power is supplied to the electrical load. An electrical load sensor is adapted to communicate a measurement of the electrical load to the controller. The controller is adapted to monitor a change in the electrical load (e.g., an increase or decrease in the current demanded), and the controller is further adapted to vary the reactant flow when the change in the electrical load exceeds a first predetermined level. The controller is further adapted to delay varying the reactant flow for a first predetermined period.

The invention preferably applies to PEM fuel cells, but it can also apply to other types of fuel cells, including solid oxide, phosphoric acid, etc. The reactant flow can be hydrogen or oxygen, or hydrogen rich fuel stream such as reformate, or oxygen rich streams such as air.

The predetermined level which the load must exceed may be defined in the controller in a number of ways to ensure robust load following performance and to reduce signal noise. For example, the predetermined level can be 110 percent of the fuel cell output power (or some other percentage), or alternatively, it can be a time period of 1 second (or some other time period).

A fuel cell voltage sensor can be associated with the system that is adapted to communicate a voltage of the fuel cell to the controller. The controller can then be configured to increase the reactant flow when the voltage of the fuel cell is below a second predetermined level defined in the controller. In some embodiments, the threshold values used by the controller to determine action can be programmed into the controller via software or user input. The controller can thus include a computer readable memory, and the controller can be adapted to store a reactant flow instruction referenced to a fuel cell electrical output parameter. In other embodiments, such values used by the controller to determine action can be input to the controller via firmware. In yet other embodiments, such values can be determined dynamically by the controller.

In some embodiments, the controller is adapted to lower the reactant flow until the voltage of the fuel cell is at least as low as the second the predetermined level. For example, subject to other criteria, such as a control logic requirement of maintaining a desired fuel cell voltage or power output, the controller can step down a reactant blower to avoid an inefficient situation of flowing too high a degree of excess reactants through the fuel cell for a given power demand.

The control network can further include a supplemental power source (e.g., a battery or a utility power grid), where the controller is adapted to supply power to the electrical load from the supplemental power source when the electrical load exceeds a third predetermined level. As an example, the controller can be adapted to supply power to the electrical load from the supplemental power source during the predetermined period.

In another aspect, the invention provides a method of controlling an integrated fuel cell system, including the following steps: determining whether a power output of a fuel cell is within a first predetermined range of an electrical load coupled to the fuel cell; lowering a reactant flow to the fuel cell when the power output is within the first predetermined range; detecting an increase of the electrical load; determining whether the increase exceeds a second predetermined range; and increasing a reactant flow to the fuel cell when the increase exceeds the second predetermined range.

Embodiments of such methods may further include other steps or features as discussed herein, either alone or in combination. For example, a voltage of the fuel cell can be measured and communicated to the controller, and the reactant flow can be increased when the voltage of the fuel cell is below a second predetermined level (e.g., 0.6 volts). Methods may also include decreasing the reactant flow until the voltage of the fuel cell is at least as low as the second the predetermined level. As another feature, reactant flow instructions referenced to a fuel cell electrical output parameter can be stored in a computer readable memory.

The electrical load can be supplied power from a supplemental power source when the electrical load exceeds a third predetermined level (e.g., of a magnitude that the fuel cell will not be able to respond to immediately, such as a transient load spike). Power can also be supplied to the electrical load from the supplemental power source during a predetermined period when the electrical load exceeds the third predetermined level. For example, the fuel cell system may take time to increase reactant output (e.g., from a reformer) to accommodate a load increase, and the controller can be adapted to accommodate such a "wait period" through reliance on the supplemental power source. Another consideration might be that a supplemental power source such as a battery may have a limited ability to respond to a power demand, so the controller can be configured to use the supplemental power source according to its performance properties.

In another aspect, a method is provided of controlling an integrated fuel cell system, including the following steps: determining whether a power output of a fuel cell is within a first predetermined range of an electrical load coupled to the fuel cell; executing a steady state algorithm when the power output is within the predetermined range; executing an up-transient algorithm when the power output is lower than the predetermined range; executing a down transient algorithm when the power output is greater than the predetermined range; wherein the steady state algorithm comprises maintaining a reactant flow above a predetermined level; wherein the up-transient algorithm comprises increasing the reactant flow; and wherein the down-transient algorithm comprises decreasing the reactant flow.

Embodiments of such methods may further include other steps or features as discussed herein, either alone or in combination. For example, a voltage of the fuel cell can be measured and communicated to the controller; and the reactant flow can be increased when the voltage of the fuel cell is below a second predetermined level. The reactant flow can be decreased until the voltage of the fuel cell is at least as low as the second the predetermined level. A reactant flow instruction can be stored and referenced to a fuel cell electrical output parameter in a computer readable memory.

Such methods may also include supplying power to the electrical load from a supplemental power source when the electrical load exceeds a third predetermined level. Alternatively, methods may include supplying power to the electrical load from a supplemental power source during a predetermined period when the electrical load exceeds a third predetermined level.

Advantages and other features of the invention will become apparent from the following description, drawing and claims.

DETAILED DESCRIPTION

The term "integrated fuel cell system" generally refers to a fuel cell stack that is coupled to components and subsystems that support the operation of the stack. For example, this could refer to a fuel cell stack that is connected to a power conditioning device that converts direct current from the fuel cell into alternating current similar to that available from the grid. It might also refer to a system equipped with a fuel processor to convert a hydrocarbon (e.g., natural gas, propane, methanol, etc.) into a hydrogen rich stream (e.g., reformate) for use in the fuel cell. An integrated fuel cell system may also include a control mechanism to automate at least some portion of the operation of the system. Integrated fuel cell systems may include a single controller common to the entire system, or may include multiple controllers specific to various parts of the system. Likewise, the operation of integrated fuel cell systems may be fully or partially automated. Also, an integrated fuel cell system may or may not be housed in a common enclosure.

As one possible example, an integrated fuel cell system could be based on four main systems: fuel processor, fuel cell stack, power conditioner, and system controller. Other systems may be configured with a fuel source such that a fuel processor is not needed, as an example. In the following discussion the reference to these main system categories is intended for illustrative purposes only, since the control algorithms of the present invention are generally suitable to a large range of fuel cell system configurations. The invention is not limited by how the conceptual or physical boundaries of such systems are defined.

Figure 1:
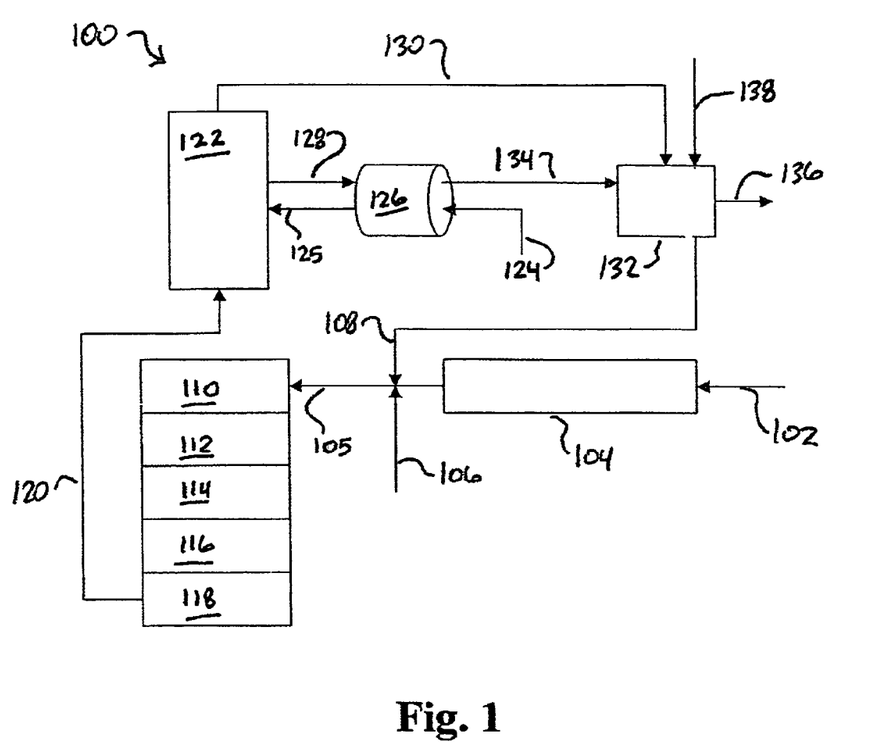
FIG. 1 is a schematic diagram of an integrated fuel cell system.

Referring to FIG. 1, an integrated fuel cell system 100 is shown. Natural gas is injected into the system through conduit 102. The natural gas flows through desulfurization vessel 104, which contains a sulfur-adsorbent material such as activated carbon. The de-sulfurized natural gas is then flowed to a conversion reactor 110 via conduit 105. Before being reacted in the conversion reactor 110, the de-sulfurized natural gas is mixed with air 106 and steam 108. It will be appreciated that the conversion reactor 110 is an autothermal reactor. The converted natural gas, referred to as reformate, then flows through a series of high temperature shift reactors 112 and 114, through a low temperature shift reactor 116, and then through a PROX reactor 118. It will be appreciated that the primary function of this series of reactors is to maximize hydrogen production while minimizing carbon monoxide levels in the reformate. The reformate is then flowed via conduit 120 to the anode chambers (not shown) of a fuel cell stack 122.

Air enters the system via conduit 124 and through conduit 106 as previously mentioned. In the present example, the fuel cell stack 122 uses sulfonated fluorocarbon polymer PEMs that need to be kept moist during operation to avoid damage. While the reformate 120 tends to be saturated with water, the ambient air 124 tends to be subsaturated. To prevent the ambient air 124 from drying out the fuel cells in stack 122, the air 124 is humidified by passing it through an enthalpy wheel 126, which also serves to preheat the air 124. The theory and operation of enthalpy wheels are described in U.S. Pat. No. 6,013,385, which is hereby incorporated by reference. The air 124 passes through the enthalpy wheel 126 through the cathode chambers (not shown) of the fuel cell stack 122. The air 124 picks up heat and moisture in the stack 122, and is exhausted via conduit 128 back through the enthalpy wheel 126. The enthalpy wheel 126 rotates with respect to the injection points of these flows such that moisture and heat from the cathode exhaust 128 is continually passed to the cathode inlet air 124 prior to that stream entering the fuel cell.

The anode exhaust from the fuel cell is flowed via conduit 130 to an oxidizer 132, sometimes referred to as an "anode tailgas oxidizer". The cathode exhaust leaves the enthalpy wheel 126 via conduit 134 and is also fed to the oxidizer 132 to provide oxygen to promote the oxidation of residual hydrogen and hydrocarbons in the anode exhaust 130. As examples, the oxidizer 132 can be a burner or a catalytic burner (similar to automotive catalytic converters). The exhaust of the oxidizer is vented to ambient via conduit 136. The heat generated in the oxidizer 132 is used to convert a water stream 138 into steam 108 that is used in the system.

Figure 2:
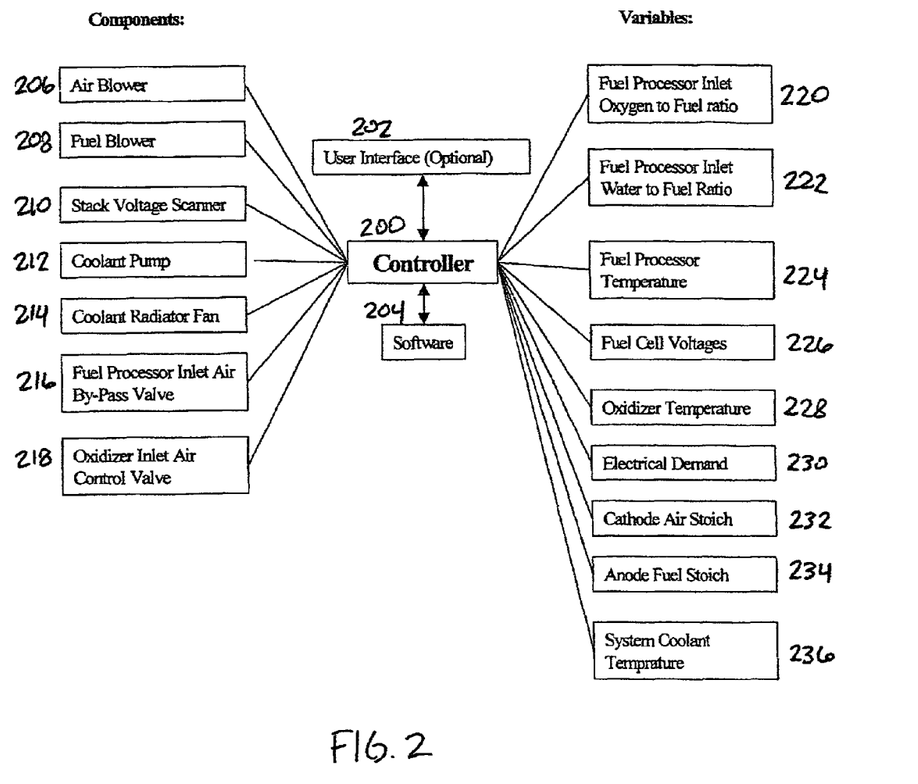
FIG. 2 is a schematic diagram of a control system for an integrated fuel cell system.

Referring to FIG. 2, a schematic is shown of a control system for an integrated high temperature PEM fuel cell system. Such a control system can include the following components, as examples: (200) an electronic controller, e.g., a programmable microprocessor; (202) a graphical user interface; (204) software for instructing the controller; (206) an air blower for providing the system with air, e.g., the fuel cell cathode and/or the fuel processor; (208) a fuel blower for driving hydrocarbon into the fuel processor; (210) a stack voltage scanner for measuring the stack voltage and/or the individual voltages of fuel cells within the stack; (212) a coolant pump for circulating a coolant through the fuel cell stack to maintain a desired stack operating temperature; (214) a coolant radiator and fan for expelling heat from the coolant to ambient; (216) a fuel processor inlet air by-pass valve for controlling the amount of air fed to the fuel processor; and (218) an oxidizer inlet air control valve.

Such a control system can operate to control the following variables, as examples: (220) the fuel processor inlet oxygen to fuel ratio; (222) the fuel processor inlet water to fuel ratio; (224) a fuel processor reactor temperature; (226) the voltage of the fuel cell stack or of individual fuel cells within the stack; (228) the oxidizer temperature; (230) electrical demand on the fuel cell system; (232) the cathode air stoich; (234) the anode fuel stoich; and (236) the system coolant temperature.

Exemplary fuel processor systems are described in U.S. Pat. Nos. 6,207,122, 6,190,623, and 6,132,689, which are hereby incorporated by reference. For instance, in the case of a natural gas fuel processor, the system may include a variable speed blower for injecting natural gas into the system, and a variable speed air blower for injecting air into the system. The gas and air may be mixed in a mixing chamber, humidified to a desired level (e.g., the system may include some method of steam generation), and be preheated (e.g., in a gas/gas heat exchanger with heat from product gas from the fuel processor). The reactant mixture may then be reacted in an autothermal reactor (ATR) to convert the natural gas to synthesis gas ($H_2O+CH_4-->3H_2+CO$; $\frac{1}{2}O_2+CH_4-->2H_2+CO$). The fuel processor may also include a shift reactor ($CO+H_2O-->H_2+CO_2$) to shift the equilibrium of the synthesis gas toward hydrogen production. The fuel processor may include multiple shift reactor stages.

Some fuel processor systems may also include a preferential oxidation (PROX) stage ($CO+\frac{1}{2}O_2-->CO_2$) to further reduce carbon monoxide levels. The PROX reaction is generally conducted at lower temperatures that the shift reaction, such as 100-200° C. Like the CPO reaction, the PROX reaction can also be conducted in the presence of an oxidation catalyst such as platinum. The PROX reaction can typically achieve CO levels less than 100 ppm. Other non-catalytic CO reduction and reformate purification methods are also known, such as membrane filtration and pressure swing adsorption systems.

In some embodiments, the autothermal reactor can be replaced by a reforming reactor (e.g., utilizing the endothermic steam reforming reaction: $H_2O+CH_4-->3H_2+CO$), or by a catalytic partial oxidation reactor (CPO reactor: $\frac{1}{2}O_2+CH_4-->2H_2+CO$), which is exothermic. These terms are sometimes used loosely or interchangeably. In general, an autothermal reactor is a reactor that combines the reforming and catalytic partial oxidation reactions to achieve a balance between the respective endothermic and exothermic elements. It should be noted that fuel processors are sometimes generically referred to as reformers, and the fuel processor output gas is sometimes generically referred to as reformate, without respect to the reaction that is actually employed.

The ATR catalyst can be a ceramic monolith that has been wash-coated with a platinum catalyst (as known in the art, e.g., operating at over 600° C.). The shift catalyst can also be platinum wash-coated ceramic monolith (e.g., operating between 300-600° C.). The shift reactor can also include a catalyst that is operable at lower temperatures. Other suitable catalyst and reactor systems are known in the art.

In some embodiments, a desulfurization stage may be placed upstream from the fuel processor to remove sulfur compounds from the fuel before it is reacted (e.g., to avoid poisoning the catalysts of the fuel processor and/or the fuel cell stack). For example, activated carbon, zeolite, and activated nickel materials are all known in the art for such application.

As known in the art, it may be desirable to control the water to fuel ratio (e.g., steam to carbon ratio) that is fed to the ATR. For example, it may be desirable to provide on average at least two water molecules for every carbon atom provided in the fuel to prevent coking. It may also be desirable in some embodiments to adjust the air stoich through the fuel cell stack to control the amount of oxygen that is introduced into the fuel processor with respect to the amount of fuel that is introduced (e.g., O2:CH4 ratio, which can effect the operation temperature of the ATR as an example).

Suitable fuel cell stack designs are well known. For example, the fuel cell systems taught in U.S. Pat. Nos. 5,858,569, 5,981,098, 5,998,054, 6,001,502, 6,071,635, 6,174,616, and 09/502,886 are each hereby incorporated by reference. In an integrated fuel cell system, the fuel cell stack may be associated with additional components and subsystems. A coolant system may be used to circulate a liquid coolant through the stack to maintain a desired operating temperature. A radiator or other heat transfer device may be placed in the coolant path to provide coolant temperature control. The coolant may also perform heat transfer in other areas of the system, such as in the fuel processor, or cooling reactants exiting the fuel processor to a desired temperature before entering the fuel cell stack. As an example, the coolant may be circulated by a variable speed pump.

The reactant delivery system associated with the fuel cell stack may include a variable speed air blower or compressor, and variable position valves and/or orifices to control the amount and pressure of fuel and air provided to the stack, as well as the ratio between the two. For a given electrical load, a certain amount of reactants must be reacted in the fuel cell to provide the power demanded by the load. In this sense, the amount of air and fuel supplied to the fuel cell stack may each be referred to in terms of stoichiometry (i.e., the stoichiometric equations associated with the fuel cell reactions: $H_2 \rightarrow 2H^+ + 2e^-$; and $O_2 + 4H^+ + 4e^- \rightarrow 2H_2O$). For example, supplying 1 "stoich" of reformate means that enough reformate is supplied to the fuel cell stack to satisfy the power demand of the load, assuming that all of the hydrogen in the reformate reacts. However, since not all of the hydrogen in the reformate will actually react, the fuel may be supplied at an elevated stoich (e.g., 2 stoich would refer to twice this amount) to ensure that the amount that actually will react will be enough to meet the power demand. Similarly, air may also be supplied to the fuel cell stack in excess of what is theoretically needed (e.g., 2 stoich).

The reactant plumbing associated with the stack may be conducted in part by a manifold. For example, the teachings of U.S. patent Ser. No. 09/703,249 are hereby incorporated by reference. Such a manifold may be further associated with a water collection tank that receives condensate from water traps in the system plumbing. The water tank may include a level sensor. Some fuel cell systems may require an external source of water during operation, and may thus include a connection to a municipal water source. A filter may be associated with the connection from the municipal water supply, such as a particulate filter, a reverse osmosis membrane, a deionization bed, etc.

Some fuel cell membranes, such as those made from sulfonated fluorocarbon polymers, require humidification. For example, it may be necessary to humidify reactant air before it is sent through the fuel cell in order to prevent drying of the fuel cell membranes. In such systems, a reactant humidification system may be required. It will be appreciated that in systems utilizing reformate, this generally refers to humidifying only the air fed to the fuel cell stack and not the fuel stream, since the reformate exiting the fuel processor is generally saturated. One method of humidification is to generate steam which is supplied to a reactant stream. Membrane humidification systems are also known, as well as enthalpy wheel systems, as taught in U.S. Pat. No. 6,013,385, which is hereby incorporated by reference.

The spent fuel exhausted from the fuel cell stack may contain some amount of unreacted hydrogen or unreacted hydrocarbon or carbon monoxide from the fuel processor. Before the spent fuel is vented to the atmosphere, it may be sent through an oxidizer to reduce or remove such components. Suitable oxidizer designs are known, such as burner designs, and catalytic oxidizers similar to automotive catalytic converters. Oxidizers may utilize air exhausted from the fuel cell stack, and may have an independent air source, such as from a blower. In some systems, the heat generated by the oxidizer may be used, for example, to generate steam for use in the fuel processor or to humidify the fuel cell reactants.

Another system that may be associated with the fuel cell stack is a mechanism for measuring the voltages of the individual fuel cells within the stack. For example, the teachings of U.S. Pat. No. 6,140,820, Ser. Nos. 09/379,088, 09/629,548, 09/629,003 are each hereby incorporated by reference. In some systems, the health of a fuel cell stack may be determined by monitoring the individual differential terminal voltages (also referred to as cell voltages) of the fuel cells. Particular cell voltages may individually vary under load conditions and cell health over a range from −1 volt to +1 volt, as an example. The fuel cell stack typically may include a large number of fuel cells (between 50-100, for example), so that the terminal voltage across the entire stack is the sum of the individual fuel cell voltages at a given operating point. As the electrical load on the stack is increased, some "weak" cells may drop in voltage more quickly than others. Driving any particular cell to a low enough voltage under an electrical load can damage the cell, so systems may include a mechanism for coordinating the cell voltages with the electrical demand and reactant supply to the fuel cell stack. For example, the teachings of U.S. patent Ser. Nos. 09/749,261, 09/749,297 are hereby incorporated by reference.

A fuel cell stack typically produces direct current at a voltage which varies according to the number of cells in the stack and the operating conditions of the cells. Applications for the power generated by a fuel cell stack may demand constant voltage, or alternating current at a constant voltage and frequency similar to a municipal power grid, etc. Integrated fuel cell systems may therefore include a power conditioning system to accommodate such demands. Technologies for converting variable direct current voltages to constant or relatively constant voltages are well known, as are technologies for inverting direct currents to alternating currents. Suitable power conditioner topologies for fuel cells are also well known. For example, the teachings of U.S. patent Ser. No. 09/749,297 are hereby incorporated by reference.

A battery system may also be associated with the power conditioning system, for example, to protect the fuel cells from fuel starvation upon sudden electrical load increases on the stack. A battery system can also be used, as examples, to supplement the peak output power of the fuel cell system, or to provide continuous power to an application while the fuel cell system is temporarily shut down (as for servicing) or removed from the load. The battery system may also include a system for periodically charging the batteries when necessary.

Some fuel cell systems may be operated independently from the power grid (grid independent systems), while other fuel cell systems may be operated in conjunction with the power grid (grid parallel systems). For grid parallel systems, the system may include a transfer switch to transfer the electrical load between the fuel cell system and the power grid. For example, in some grid parallel systems, the electrical load can be switched from the fuel cell system to the grid when the fuel cell system needs to be shut down for maintenance. In still other grid parallel systems, the electrical load can be shared between the fuel cell system and the grid. The fuel cell can also be used to feed power to the grid (in this sense, the grid may be referred to as a "sink"), while an appliance takes its power from the grid. Other arrangements are possible.

System controllers may automate the operation of fuel cell systems to varying degrees, and may have varying capacities for adjustment and reconfiguration. For example, some controllers may rely in part on software for instruction sets to provide enhanced flexibility and adaptability, while other controllers may rely on hardware to provide enhanced reliability and lower cost. Control systems may also include combinations of such systems. Controllers may include an algorithm that coordinates open and closed loop functions. In this context, an open loop function is one that does not utilize feedback, such as adjusting a blower according to a look-up table without verifying the effect of the adjustment or iterating the adjustment toward a desired effect. A closed loop function is one that utilizes feedback to iterate adjustments toward a desired effect.

In general, the controller circuitry may include data inputs from system components such as safety sensors and thermocouples throughout the system. As an example, such data inputs may report data in the form of variable voltage or current signals, or as binary on/off signals. The controller circuitry may also include devices to control the voltage and/or current supplied to various components in the system, for example to control variable speed pumps and blowers. The power supplied to system components may be referred to as the parasitic load.

In one embodiment, a control system to enable an integrated fuel cell system to follow a variable electrical load is based on four operating states. In a first state (steady state), there are either no load changes, or the load changes that occur are within a "dead band" threshold range in which no action is taken. Essentially, in this state the system operates at steady state. In a second state (up transient), in response to an increased load, a control signal is sent to the fuel processor to increase the amount of reformate provided to the fuel cell stack. In a third state (down transient), a control signal is sent to the fuel processor to decrease the amount of reformate provided to the fuel cell stack. In a fourth state (equilibration), the controller delays changes in operating state for a certain amount of time.

In another embodiment, an additional stoich optimization state may be coordinated wherein one or both reactant stoichs are optimized by lowering them as far as possible without lowering the stack voltage or a weak cell voltage below a desired point. See, e.g., U.S. patent Ser. No. 09/749,298, which is hereby incorporated by reference. It will be appreciated that the performance of the fuel cell stack can vary and/or degrade over time, and can vary from stack to stack, so it may be desirable to treat the amount of reformate needed for a given electrical load as a dynamic variable. In some embodiments, the control algorithm can include a learning function where the stoich optimization function described above is used to "teach" the system what reactant stoichs are appropriate for a given electrical demand or for a given system. As an example, such a learning function can populate a dynamic look-up table that is used by the system as a starting point for requesting an amount of reformate to satisfy an electrical load. As another example, the learning function can include a correction factor for the stack power demand and/or reformate demand signals to adjust hydrogen and/or oxygen stoichs according to the optimized values. Also, in this way, the system can minimize the frequency that the stoich optimization step is necessary.

Steady State

In some embodiments, the steady state mode may include a logical operation that determines whether the stack is producing enough power to satisfy the electrical load on the stack. For example, the size of the electrical load on the stack could be measured (e.g., in terms of power or current demand at a given voltage, etc.) and a controller could compare this value to a measured power output of the stack (other parameters can also be measured: stack voltage, cell voltages, stack current, etc.). If the stack is not producing enough power, the controller is shifted to the up-transient state. If the stack is producing more than enough power, the controller is shifted to the down-transient state. In some embodiments, the difference between the amount demanded by the load and the amount supplied by the stack can be compared to a "deadband" range in which no action is taken.

Up-Transient State

In general, the up transient state includes a logical operation that increases the output of the fuel processor (e.g., by increasing the flows of reactants to the fuel processor) until the power supplied by the stack is enough to satisfy the electrical load on the stack.

In some embodiments, the reformer may only be able to respond to up transients of a certain size without affecting the outlet gas composition. For example, if an up-transient signal causes a sudden increase in fuel beyond a certain range, the reformer may produce elevated amounts of carbon monoxide or other undesired components until the reformer reaches equilibrium at the new set point. In such embodiments, the up-transient state may include a logical operation to compare the difference between stack output and electrical demand with a value representing a maximum acceptable up-transient step size. In some embodiments, the up-transient state may include a logical operation to compare the difference between stack output and electrical demand with a value representing a maximum acceptable up-transient change rate. Thus, by controlling the up-transient rate of the reformer, the above situation (e.g., temporary elevated CO level) can be avoided.

In some embodiments, in the up-transient state, the controller can coordinate the supply of power between the fuel cell stack and a battery system. For example, battery systems may be used to supplement power supplied by the fuel cell stack if the fuel cell stack is unable to meet the transient (e.g., load increase is too high or too sudden). In some systems, the controller can place a limit on the amount of load on the stack (e.g., a dynamic current limit), to prevent excessive load from driving the cell voltages below acceptable levels due to fuel starvation.

In some embodiments, the up-transient state can include a logical operation that accounts for reformer response time. For example, the controller in the up-transient state may use this response time to delay sending signals to a power conditioning system to determine factors such as the amount of power that is supplied to the load and the amount of power that is taken from the stack. In addition, as previously indicated, the system may also employ a fourth equilibration state where the system delays changing operating states for a certain period of time. In some cases, this period can correspond to the time it takes for the system to equilibrate to the new operating point.

In some embodiments, the up-transient state may include a logical operation that increases the hydrogen stoich that the system requests in response to a given load. As an example, running at a higher than normal hydrogen stoich during a transient can increase voltage stability during the transient.

Down Transient

In general, the down-transient state includes a logical operation that decreases the output of the fuel processor (e.g., by decreasing the flows of reactants to the fuel processor) until the power supplied by the stack is appropriate to satisfy the electrical load on the stack.

In some embodiments, the reformer may only be able to respond to down transients of a certain size without affecting the outlet gas composition. For example, if a down-transient signal causes a sudden decrease in fuel beyond a certain range, the reformer may produce elevated amounts of carbon monoxide or other undesired components until the reformer reaches equilibrium at the new set point. In such embodiments, the down-transient state may include a logical operation to compare the difference between stack output and electrical demand with a value representing a maximum acceptable down-transient step size. Thus, by controlling the down-transient rate of the reformer, the above situation (e.g., temporary elevated CO level) can be avoided.

In some embodiments, the down-transient state can also include a logical operation that accounts for reformer response time. For example, the controller in the down-transient state may use this response time to delay decreasing the amount of reactants that are provided to the reformer, while sending signals to a power conditioning system without delay (e.g., to determine factors such as the amount of power that is supplied to the load and the amount of power that is taken from the stack). In addition, as previously indicated, the system may also employ a fourth equilibration state where the system delays changing operating states for a certain period of time. In some cases, this period can correspond to the time it takes for the system to equilibrate to the new operating point. In some cases, the system can sink the excess power to a battery system or to another application such as sinking the power to the grid.

In some embodiments, the down-transient state may include a logical operation that increases the hydrogen stoich that the system requests in response to a given load. As an example, running at a higher than normal hydrogen stoich during a transient can increase voltage stability during the transient.

Control Algorithms

In another aspect, the invention provides a control apparatus for executing any of the above logic schemes for a load following fuel cell system, alone or in combination. Techniques for preparing circuitry to provide electronic control systems are well known in the art, such that a system under the present invention with the features and aspects described above could be implemented by one of ordinary skill, for example by reference in part to the patents mentioned above.

In another aspect of the invention, a method is provided for enabling a fuel cell system to accommodate variable demands for power output. Such method may include any of the above logic schemes for a load following fuel cell system, alone or in combination.

In another aspect of the invention, an integrated load following fuel cell system is provided with any of the features described above, either alone or in combination.

In another embodiment of the invention, an article of manufacture is provided that includes at least one computer usable medium having computer readable code embodied thereon for enabling a fuel cell system to accommodate variable demands for power output according to any of the above logic schemes, alone or in combination.

In another embodiment, the invention provides at least one program storage device readable by a machine, tangibly embodying at least one program of instructions executable by the machine to perform a method for enabling a fuel cell system to accommodate variable demands for power output according to any of the above logic schemes, alone or in combination.

In another aspect, the invention also provides methods for operating fuel cell systems according to the concepts and features discussed herein. For example, referring to FIG. 3, such a method 300 includes the following steps: (302) determining whether a power output of a fuel cell is within a first predetermined range of an electrical load coupled to the fuel cell; (304) lowering a reactant flow to the fuel cell when the power output is within the first predetermined range; (306) detecting an increase of the electrical load; (308) determining whether the increase exceeds a second predetermined range; and (310) increasing a reactant flow to the fuel cell when the increase exceeds the second predetermined range.

Figure 3:
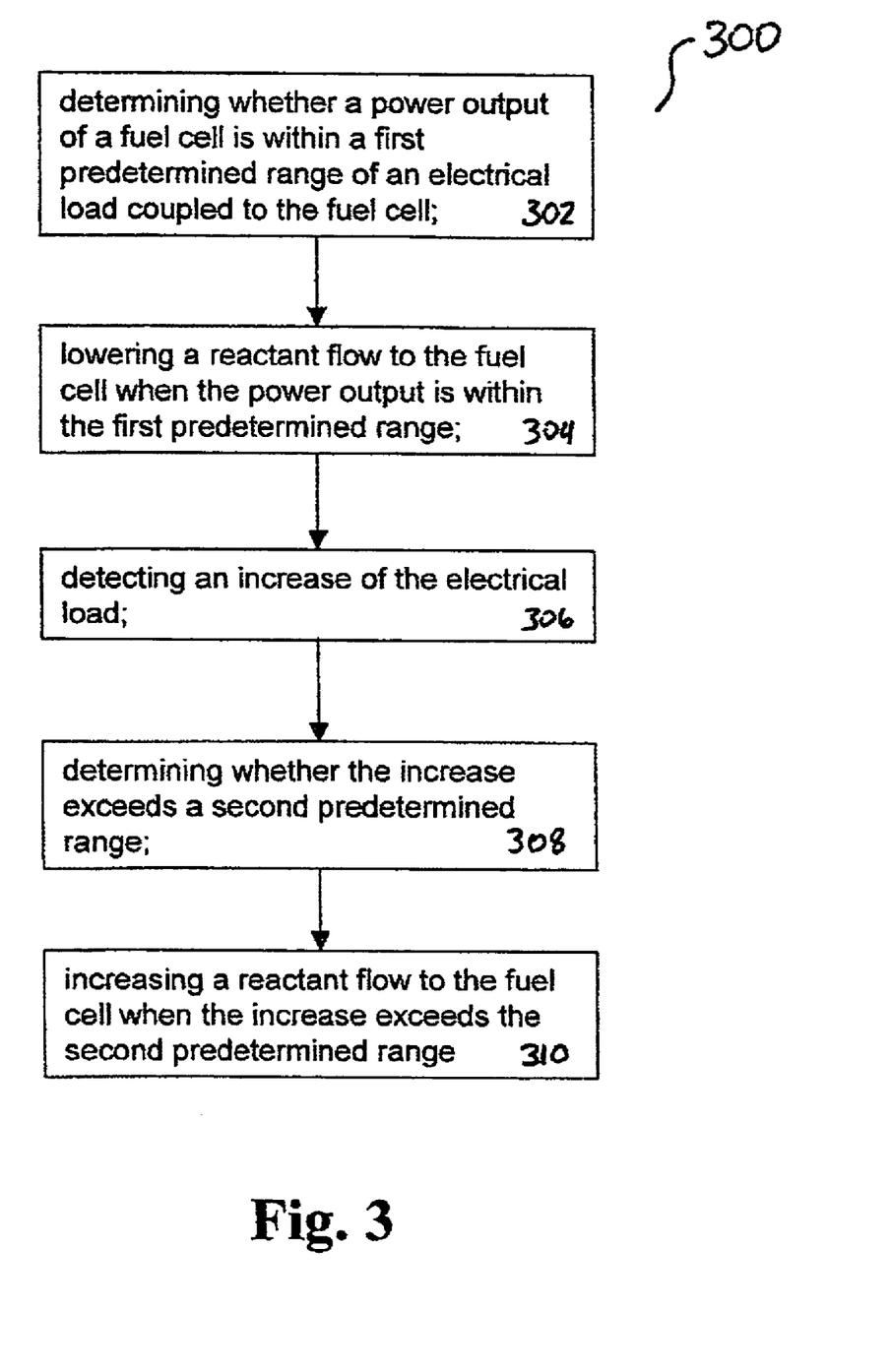
FIG. 3 is a flow chart for a method of operating a fuel cell system under the present invention.

Additional embodiments of such methods may further include various other steps or features. For example, a voltage of the fuel cell can be measured and communicated to the controller, and the reactant flow can be increased when the voltage of the fuel cell is below a second predetermined level (e.g., 0.6 volts). Methods may also include decreasing the reactant flow until the voltage of the fuel cell is at least as low as the second the predetermined level. As another feature, reactant flow instructions referenced to a fuel cell electrical output parameter can be stored in a computer readable memory.

The electrical load can be supplied power from a supplemental power source when the electrical load exceeds a third predetermined level (e.g., of a magnitude that the fuel cell will not be able to respond to immediately, such as a transient load spike). Power can also be supplied to the electrical load from the supplemental power source during a predetermined period when the electrical load exceeds the third predetermined level. For example, the fuel cell system may take time to increase reactant output (e.g., from a reformer) to accommodate a load increase, and the controller can be adapted to accommodate such a "wait period" through reliance on the supplemental power source. Another consideration might be that a supplemental power source such as a battery may have a limited ability to respond to a power demand, so the controller can be configured to use the supplemental power source according to its performance properties.

Figure 4:
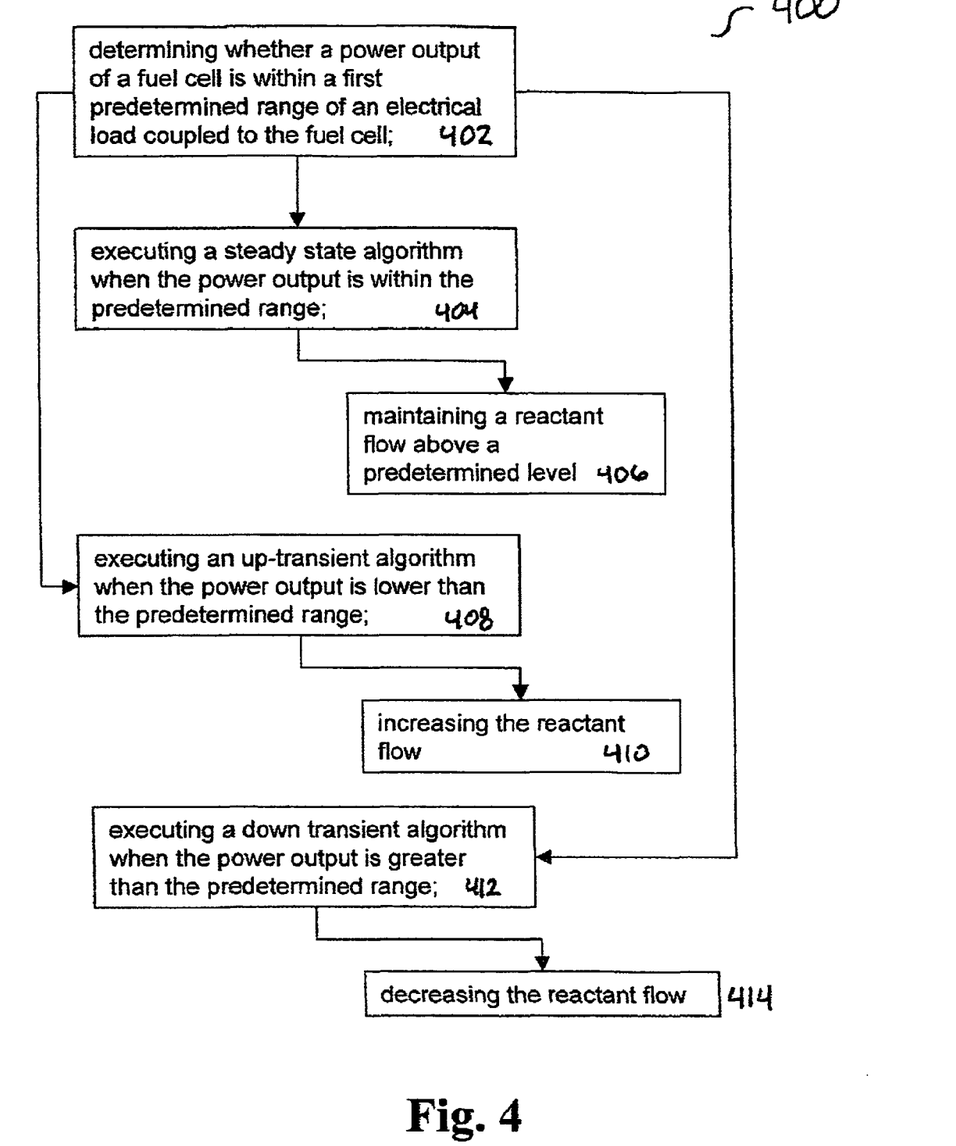
FIG. 4 is a flow chart for a method of operating a fuel cell system under the present invention.

Referring to FIG. 4, another method 400 is shown for operating a fuel cell system under the present invention, including the following steps: (402) determining whether a power output of a fuel cell is within a first predetermined range of an electrical load coupled to the fuel cell; (404) executing a steady state algorithm when the power output is within the predetermined range; (408) executing an up-transient algorithm when the power output is lower than the predetermined range; (410) executing a down transient algorithm when the power output is greater than the predetermined range; (406) wherein the steady state algorithm comprises maintaining a reactant flow above a predetermined level; (410) wherein the up-transient algorithm comprises increasing the reactant flow; and (414) wherein the down-transient algorithm comprises decreasing the reactant flow.

Embodiments of such methods may further include other steps or features. For example, a voltage of the fuel cell can be measured and communicated to the controller, and the reactant flow can be increased when the voltage of the fuel cell is below a second predetermined level. The reactant flow can be decreased until the voltage of the fuel cell is at least as low as the second the predetermined level. A reactant flow instruction can be stored and referenced to a fuel cell electrical output parameter in a computer readable memory.

Such methods may also include supplying power to the electrical load from a supplemental power source when the electrical load exceeds a third predetermined level. Alternatively, methods may include supplying power to the electrical load from a supplemental power source during a predetermined period when the electrical load exceeds a third predetermined level.

While the invention has been disclosed with respect to a limited number of embodiments, those skilled in the art, having the benefit of this disclosure, will appreciate numerous modifications and variations therefrom. It is intended that the invention covers all such modifications and variations as fall within the true spirit and scope of the invention.

What is claimed is:

1. A control network for an integrated fuel cell system, comprising:
    a fuel cell having an output power, the fuel cell having a voltage and an output current;
    an electrical load connected to the fuel cell such that the fuel cell output power is supplied to the electrical load;
    an electrical load sensor adapted to communicate a measurement of the electrical load; and
    a controller coupled to the electrical load sensor to:
        based on comparison of a rate at which the electrical load changes relative to a predetermined threshold rate, determine whether the fuel cell system is to transition from a steady state of operation to an up transient state in which the system increases a current level of the output power, and
        based on the determination, first transition the fuel cell system to an equilibrium state different from the up transient state to allow the system to equilibrate to a new operating point and thereafter transition the fuel cell system to the up transient state to increase the fuel cell output power.

2. The control network of claim 1, wherein the fuel cell is a PEM fuel cell.

3. The control network of claim 1, wherein the controller is adapted to vary a flow of hydrogen to the fuel cell.

4. The control network of claim 1, wherein the electrical load comprises a residential appliance.

5. The control network of claim 1, wherein
    the electrical load sensor comprises a fuel cell voltage sensor adapted to communicate a voltage of the fuel cell to the controller, and
    the controller is adapted to increase a reactant flow to the fuel cell in response to the voltage of the fuel cell being below a predetermined voltage.

6. The control network of claim 5, wherein the controller is further adapted to lower the reactant flow until the voltage of the fuel cell reaches the predetermined voltage.

7. The control network of claim 1, wherein the controller comprises a computer readable memory, and the controller is adapted to store a reactant flow instruction referenced to a fuel cell electrical output parameter.

8. The control network of claim 1, further comprising a supplemental power source, wherein the controller is adapted to supply power to the electrical load from the supplemental power source when the electrical load exceeds a predetermined power demand.

9. The control network of claim 1, further comprising a supplemental power source, wherein the controller is adapted to cause the supplemental power to supply power to the electrical load during the equilibrium state.

\* \* \* \* \*